(12) United States Patent
Kawahara et al.

(10) Patent No.: US 11,162,557 B2
(45) Date of Patent: Nov. 2, 2021

(54) DAMPER DEVICE

(71) Applicant: EXEDY Corporation, Neyagawa (JP)

(72) Inventors: Yuki Kawahara, Neyagawa (JP); Yusuke Tomita, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 343 days.

(21) Appl. No.: 16/344,915

(22) PCT Filed: Oct. 23, 2017

(86) PCT No.: PCT/JP2017/038123
§ 371 (c)(1),
(2) Date: Apr. 25, 2019

(87) PCT Pub. No.: WO2018/110085
PCT Pub. Date: Jun. 21, 2018

(65) Prior Publication Data
US 2019/0264774 A1 Aug. 29, 2019

(30) Foreign Application Priority Data

Dec. 12, 2016 (JP) .............................. JP2016-240113

(51) Int. Cl.
*F16F 15/123* (2006.01)
*F16D 3/12* (2006.01)
(Continued)

(52) U.S. Cl.
CPC .......... *F16F 15/12353* (2013.01); *F16D 3/12* (2013.01); *F16F 15/123* (2013.01);
(Continued)

(58) Field of Classification Search
CPC .... F16F 15/12353; F16F 15/14; F16F 15/123; F16F 15/1297; F16F 15/145;
(Continued)

(56) References Cited

U.S. PATENT DOCUMENTS 8,651,965 B2 * 2/2014 Amano ................. F16F 15/129
464/68.2
9,556,944 B2 * 1/2017 Sekiguchi ............... F16H 45/02
(Continued)

FOREIGN PATENT DOCUMENTS

CN 102822562 A 12/2012
CN 104471279 A 3/2015
(Continued)

OTHER PUBLICATIONS

1st Office Action of the corresponding Chinese Application No. 201780075987.5, dated Jul. 3, 2020, 9 pp.
(Continued)

*Primary Examiner* — Greg Binda
(74) *Attorney, Agent, or Firm* — United IP Counselors, LLC

(57) ABSTRACT

A damper device includes a damper device body, an output shaft and a dynamic vibration absorber. The damper device body includes an input member and an output member. The input member and the output member are coupled to be rotatable relative to each other. The output shaft outputs a torque transmitted to it from the damper device body. The dynamic vibration absorber is attached to the output shaft.

6 Claims, 11 Drawing Sheets

(51) Int. Cl.
*F16F 15/129* (2006.01)
*F16F 15/14* (2006.01)

(52) U.S. Cl.
CPC .......... *F16F 15/1297* (2013.01); *F16F 15/14* (2013.01); *F16F 15/145* (2013.01); *F16D 2300/22* (2013.01); *F16F 2222/08* (2013.01); *F16F 2232/02* (2013.01); *Y10T 74/2128* (2015.01)

(58) Field of Classification Search
CPC ............... F16F 2222/08; F16F 2232/02; F16F 15/1457; F16D 3/12; F16D 2300/22; Y10T 74/2128
USPC .................................................... 464/3, 68.2
See application file for complete search history.

(56) References Cited

U.S. PATENT DOCUMENTS

| | | | | |
|---|---|---|---|---|
| 9,958,027 | B2 * | 5/2018 | Sekiguchi | ............... F16H 45/02 |
| 10,760,644 | B2 * | 9/2020 | Kawahara | ............. F16F 15/173 |
| 2014/0182993 | A1 | 7/2014 | Rusch et al. | |
| 2015/0167779 | A1 | 6/2015 | Ulbrich et al. | |

FOREIGN PATENT DOCUMENTS

| | | |
|---|---|---|
| CN | 111022575 A | 4/2020 |
| DE | 102015201962 A1 | 9/2015 |
| JP | H11-030281 A | 2/1999 |
| JP | 2007247723 A | 9/2007 |
| JP | 2014-145413 A | 8/2014 |
| JP | 2014-152834 A | 8/2014 |
| JP | 2014-206244 A | 10/2014 |
| WO | 2012/124014 A1 | 9/2012 |
| WO | 2014/174563 A1 | 10/2014 |
| WO | 2017/029931 A1 | 2/2017 |

OTHER PUBLICATIONS

International Search Report issued in International Patent Application No. PCT/JP2017/038123 dated Dec. 26, 2017, 4pp.

* cited by examiner

DAMPER DEVICE

CROSS-REFERENCE TO RELATED APPLICATIONS

This application is the U.S. National Phase of International Application No. PCT/JP2017/038123, filed Oct. 23, 2017. That application claims priority to Japanese Patent Application No. 2016-240113, filed Dec. 12, 2016. Both of those applications are incorporated by reference herein in their entireties.

TECHNICAL FIELD

The present disclosure relates to a damper device.

BACKGROUND ART

For example, in automobiles, a damper device is installed between an engine and a transmission, as shown in Japan Laid Open Patent Application Publication No. 2007-247723. The damper device includes an input member, an output member and elastic members. The input member is a member to which a torque from the engine is inputted. The output member outputs the torque, inputted to the input member, to the transmission. The elastic members elastically couple the input member and the output member. Fluctuations in velocity of rotation from the engine are inhibited by the damper device installed in a torque transmission path between the engine and the transmission.

BRIEF SUMMARY

It is preferable for the damper device described above to inhibit fluctuations in rotational velocity as appropriately as possible. It is an object of the present advancement to inhibit fluctuations in rotational velocity as appropriately as possible.

A damper device according to an aspect of the present advancement includes a damper device body, an output shaft and a dynamic vibration absorber. The damper device body includes an input member and an output member. The input member and the output member are coupled to be rotatable relative to each other. The output shaft outputs a torque transmitted thereto from the damper device body. The dynamic vibration absorber is attached to the output shaft.

According to this configuration, the dynamic vibration absorber is attached to the output shaft. Hence, fluctuations in rotational velocity can be inhibited as appropriately as possible. Additionally, the dynamic vibration absorber is attached not to the damper device body but to the output shaft. Hence, attaching the dynamic vibration absorber can be made without making the structure of the damper device body greatly different from a well-known structure thereof. Because of this, the damper device body can be compatible among, for instance, vehicles with different engine settings.

Preferably, the dynamic vibration absorber includes a base member and a mass body. The base member is attached to the output shaft. The mass body is disposed to be rotatable relative to the base member.

Preferably, the base member includes a first through hole. Additionally, the output shaft is coupled to the first through hole.

Preferably, the output shaft is spline-coupled to the first through hole.

Preferably, the base member includes a boss portion provided with the first through hole.

Preferably, the output member includes a recess. Additionally, the boss portion is coupled to the recess.

Preferably, the boss portion is spline-coupled to the recess.

Preferably, the recess is provided as a second through hole.

Preferably, the mass body sways with respect to the base member in a circumferential direction, and has a swaying center arranged in a different position from a rotational center of the base member.

Preferably, the dynamic vibration absorber further includes a centrifugal element and a cam mechanism. The centrifugal element is disposed to receive a centrifugal force generated by rotation of the output shaft. The cam mechanism converts the centrifugal force acting on the centrifugal element into a circumferential force.

Preferably, the base member further includes a body and a torque limiting portion. The torque limiting portion limits transmission of the torque inputted to the body from the output shaft.

According to the present advancement, fluctuations in rotational velocity can be inhibited as appropriately as possible.

DESCRIPTION OF EMBODIMENTS

An exemplary embodiment of a damper device according to the present advancement will be explained with reference to drawings. It should be noted that in the following explanation, the term "axial direction" means an extending direction of a rotational axis O of a damper device 100. Additionally, the term "radial direction" means a radial direction of an imaginary circle about the rotational axis O. Moreover, the term "circumferential direction" means a circumferential direction of the imaginary circle about the rotational axis O.

[Damper Device]

Figure 1:
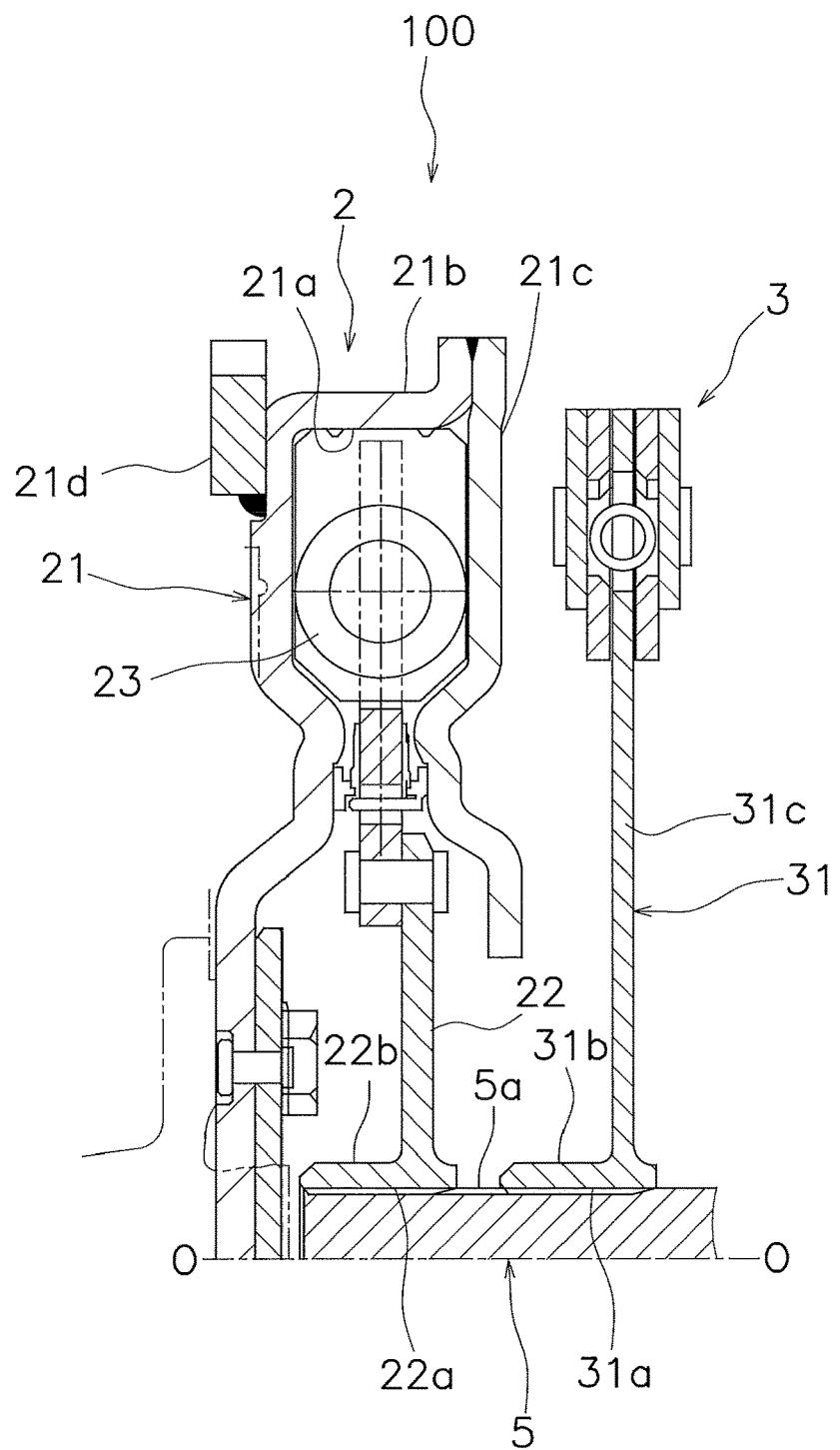
FIG. 1 is a cross-sectional side view of a damper device.

As shown in FIG. 1, the damper device 100 includes a damper device body 2, a dynamic vibration absorber 3 and an output shaft 5. The damper device 100 is configured to transmit a torque from an engine and attenuate fluctuations in rotational velocity. The damper device 100 is disposed to be rotatable about the rotational axis O. The damper device 100 is of a dry type. In other words, the damper device 100 is disposed in a dry environment not filled with a viscous fluid. Additionally, an input member 21 and an output member 22, both of which will be described below, are rotated in the dry environment. The damper device 100 does not include a casing in which the input member 21 and the output member 22 are accommodated.

[Damper Device Body]

The damper device body 2 includes the input member 21 and the output member 22. The input member 21 is, for instance, a flywheel to which the torque from the engine is inputted. The input member 21 is fixed to a crankshaft of the engine. The input member 21 is disposed to be rotatable about the rotational axis O.

The input member 21 has a disc shape. The input member 21 includes an accommodation space 21a. The accommodation space 21a extends in the circumferential direction. Elastic members 23 to be described are accommodated in the accommodation space 21a. Additionally, the accommodation space 21a may be filled up with a viscous fluid. For example, the accommodation space 21a may be filled up with grease.

The input member 21 includes an input plate 21b and an accommodation plate 21c. The accommodation space 21a is formed by the input plate 21b and the accommodation plate 21c. Additionally, the input member 21 includes a ring gear 21d. The ring gear 21d is fixed to the input plate 21b.

The output member 22 outputs the torque, inputted to the input member 21, to the output shaft 5. The output member 22 is rotatable about the rotational axis O. The output member 22 has a disc shape and includes a second through hole 22a in a middle part thereof. The second through hole 22a is provided with a spline groove on the inner peripheral surface thereof. Specifically, the output member 22 includes a second boss portion 22b. The second boss portion 22b has a cylindrical shape and includes the second through hole 22a.

The output member 22 is coupled to the input member 21 so as to be rotatable relative thereto. Specifically, the damper device body 2 includes a plurality of elastic members 23. The elastic members 23 are, for instance, coil springs. The elastic members 23 elastically couple the input member 21 and the output member 22.

[Output Shaft]

The output shaft 5 receives a torque transmitted thereto from the damper device body 2. The output shaft 5 outputs the torque, transmitted thereto from the damper device body 2, to a member disposed downstream of the damper device 100. For example, the output shaft 5 outputs the torque, transmitted thereto from the damper device body 2, to a transmission (not shown in the drawings) disposed downstream of the damper device 100. In other words, the output shaft 5 may be configured as an input shaft of the transmission.

The output shaft 5 has a columnar shape. The output shaft 5 is disposed to be rotatable about the rotational axis O. The output shaft 5 is coupled to the second through hole 22a of the output member 22. The output shaft 5 is provided with a spline groove on an outer peripheral surface 5a thereof. Because of this, the output shaft 5 is spline-coupled to the output member 22.

[Dynamic Vibration Absorber]

The dynamic vibration absorber 3 is attached to the output shaft 5. The dynamic vibration absorber 3 is rotatable unitarily with the output shaft 5. In other words, the dynamic vibration absorber 3 is disposed to be rotatable about the rotational axis O. The dynamic vibration absorber 3 is disposed in axial alignment with the damper device body 2. In other words, as seen in the axial direction, the dynamic vibration absorber 3 is disposed to overlap the damper device body 2.

Figure 2:
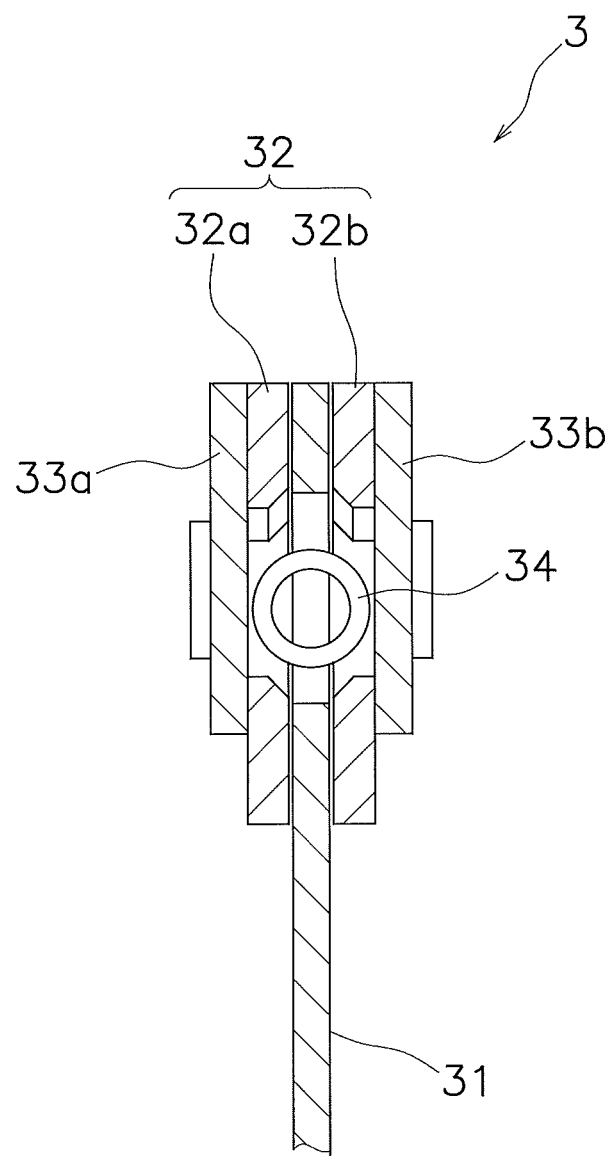
FIG. 2 is a cross-sectional side view of a dynamic vibration absorber.

The dynamic vibration absorber 3 is configured to attenuate vibration of the output shaft 5. As shown in FIG. 2, the dynamic vibration absorber 3 includes a base member 31 and a mass body 32. Additionally, the dynamic vibration absorber 3 includes a first lid member 33a, a second lid member 33b and a plurality of coil springs 34. It should be noted that in the present exemplary embodiment, the mass body 32 is composed of a first mass body 32a and a second mass body 32b.

As shown in FIG. 1, the base member 31 is rotatable about the rotational axis O. The base member 31 is attached to the output shaft 5. Specifically, the base member 31 includes a first through hole 31a, extending in the axial direction, in a middle part thereof. Additionally, the output shaft 5 is coupled to the first through hole 31a. More specifically, the first through hole 31a is provided with a spline groove on the inner peripheral surface thereof. Additionally, the output shaft 5 is spline-coupled to the first through hole 31a. Because of this, the base member 31 is unitarily rotated with the output shaft 5.

The base member 31 has a disc shape. The base member 31 includes a first boss portion 31b (an exemplary boss portion of the present advancement) and a body 31c. The first boss portion 31b has a cylindrical shape and includes the first through hole 31a. The body 31c has a disc shape and extends radially outward from the first boss portion 31b. The body 31c and the first boss portion 31b are provided as a single member.

Figure 3:
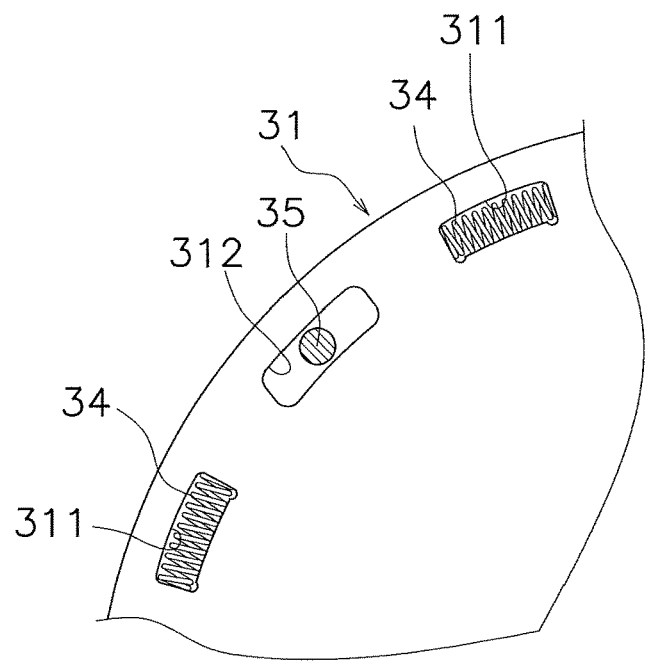
FIG. 3 is an enlarged front view of a base member.

As shown in FIG. 3, the base member 31 includes a plurality of accommodation portions 311. The respective accommodation portions 311 are disposed at intervals in the circumferential direction. Each accommodation portion 311 extends in the circumferential direction. A plurality of elongated holes 312 are provided such that each is located between adjacent accommodation portions 311. The elongated holes 312, each of which extends in the circumferential direction, are disposed on the circumference of an imaginary circle on which the accommodation portions 311 are disposed.

As shown in FIG. 2, the first and second mass bodies 32a and 32b are rotatable relative to the output shaft 5. Specifically, the first and second mass bodies 32a and 32b are rotatable relative to the base member 31. It should be noted that in the present exemplary embodiment, the base member 31 is unitarily rotated with the output shaft 5. Additionally, the first and second mass bodies 32a and 32b are rotatable about the rotational axis O.

The first and second mass bodies 32a and 32b are formed by stamping of a sheet metal member. Each of the first and second mass bodies 32a and 32b has, for instance, an annular shape. The first and second mass bodies 32a and 32b are disposed on the both axial sides of the base member 31. In other words, the first mass body 32a is disposed on the engine side of the base member 31, whereas the second mass body 32b is disposed on the transmission side of the base member 31.

Figure 4:
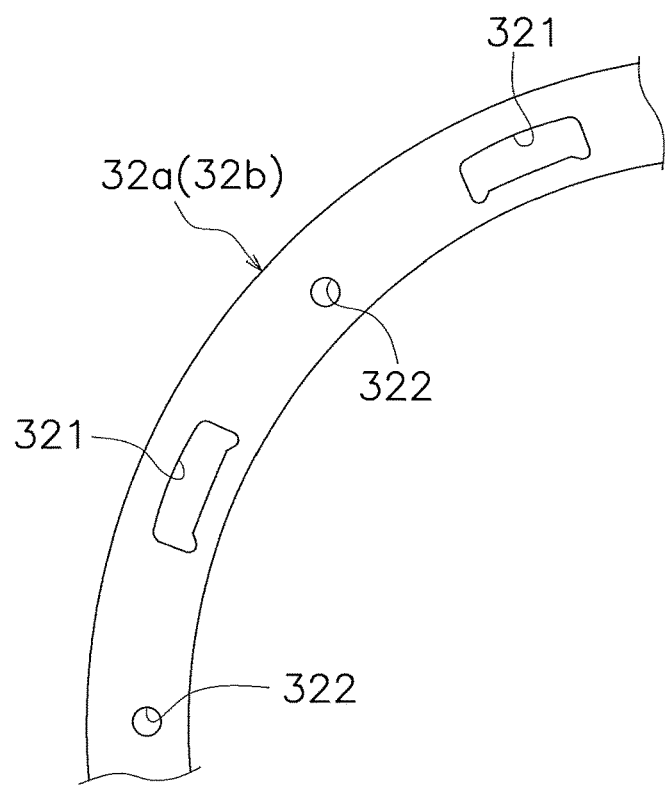
FIG. 4 is an enlarged front view of a mass body.

As shown in FIG. 4, each of the first and second mass bodies 32a and 32b includes a plurality of accommodation portions 321. The respective accommodation portions 321 are disposed at intervals in the circumferential direction. The accommodation portions 321 are disposed in corresponding positions to the accommodation portions 311 of the base member 31, respectively. Additionally, each of the first and second mass bodies 32a and 32b includes third through holes 322, each of which is located in a corresponding position to the circumferential middle of each elongated hole 312 of the base member 31.

As shown in FIG. 2, the first lid member 32a has an annular shape and is disposed on the engine side of the first mass body 32a. In other words, the first mass body 32a is interposed and held between the first lid member 33a and the base member 31. As shown close-up in FIG. 5, the first lid member 33a includes fourth through holes 331 in corresponding positions to the third through holes 322 of the first mass body 32a, respectively.

As shown in FIG. 2, the second lid member 33b is disposed on the transmission side of the second mass body 32b. In other words, the second mass body 32b is interposed and held between the second lid member 33b and the base member 31. As shown close-up in FIG. 5, the second lid member 33b is an annular member. The second lid member 33b includes the fourth through holes 331 in corresponding positions to the third through holes 322 of the second mass body 32b, respectively.

As shown in FIGS. 2 to 4, each of the plural coil springs 34 is accommodated in each accommodation portion 311 of the base member 31 and each pair of accommodation portions 321 of the first and second mass bodies 31a and 32b. Additionally, the both ends of each coil spring 34 make contact with the circumferential ends of each accommodation portion 311 of the base member 31 and those of each pair of accommodation portions 321 of the first and second mass bodies 32a and 32b.

Figure 5:
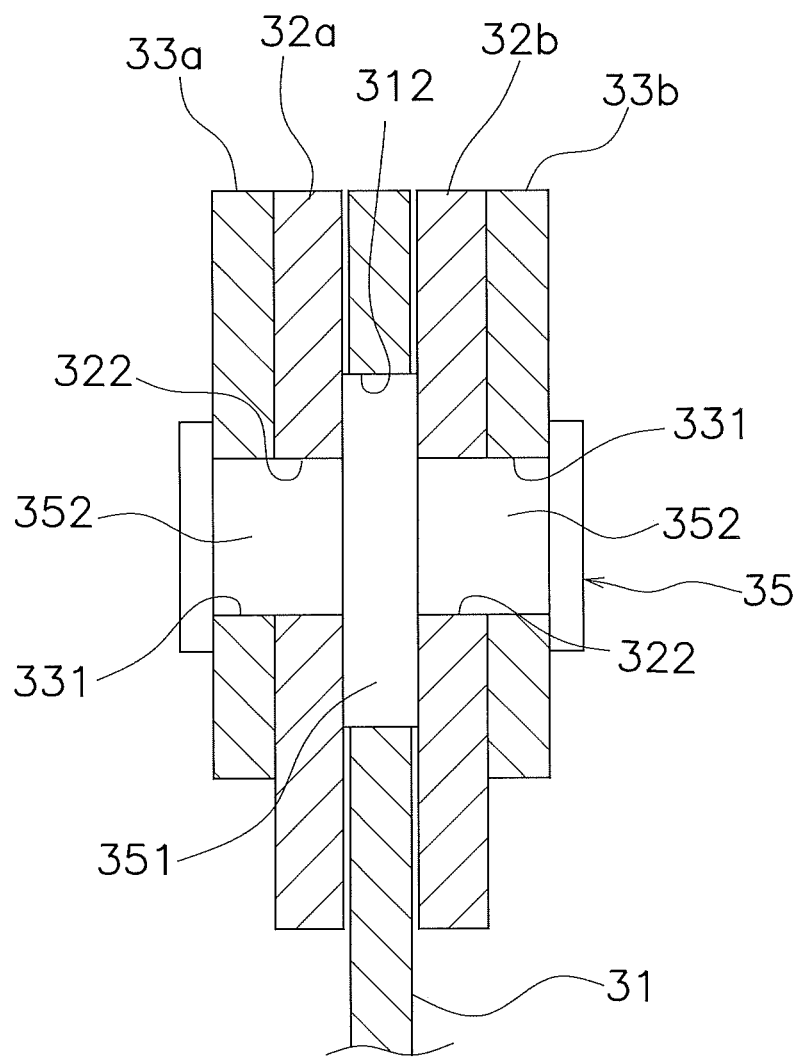
FIG. 5 is an enlarged cross-sectional view of the dynamic vibration absorber.

As shown in FIG. 5, each of stop pins 35 includes a large diameter trunk 351 in the axially middle part thereof and includes small diameter trunks 352 on the both sides of the large diameter trunk 351.

The diameter of the large diameter trunk 351 is larger than that of each pair of through holes 322 of the first and second mass bodies 32a and 32b, and is smaller than that (radial dimension) of each elongated hole 312 of the base member 31. Additionally, the thickness of the large diameter trunk 351 is slightly larger than that of the base member 31.

The small diameter trunks 352 penetrate each pair of third through holes 322 of the first and second mass bodies 32a and 32b and each pair of fourth through holes 331 of the first and second lid members 33a and 33b. Additionally, the first and second mass bodies 32a and 32b and the both lid members 33a and 33b are fixed to the both axial sides of the base member 31 by swaging the heads of the small diameter trunks 352.

With the configuration described above, the base member 31 is rotatable relative to the first and second mass bodies 32a and 32b and the two lid members 33a and 33b in a range that each stop pin 35 is movable in each elongated hole 312 of the base member 31. Additionally, relative rotation of the both is restricted when the large diameter trunk 351 of each stop pin 35 makes contact with one end of each elongated hole 312.

Modifications

One exemplary embodiment of the present advancement has been explained above. However, the present advancement is not limited to the aforementioned exemplary embodiment, and a variety of changes can be made without departing from the gist of the present advancement.

Modification 1

Figure 6:
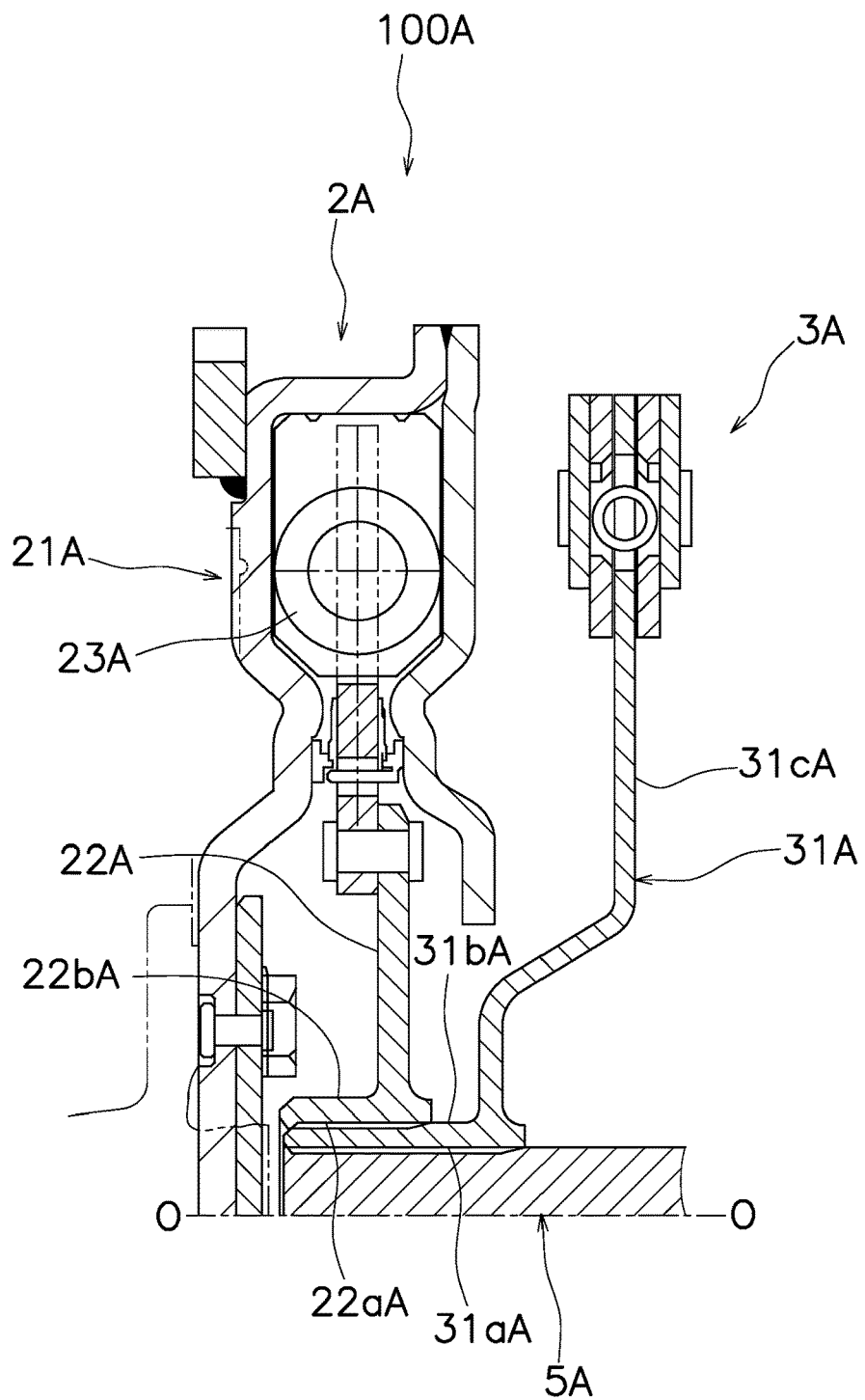
FIG. 6 is a cross-sectional side view of a damper device according to a modification.

In the aforementioned exemplary embodiment, the output shaft 5 is coupled to each of the first through hole 31a of the base member 31 and the second through hole 22a of the output member 22. However, the damper device 100 is not limited to have the configuration. For example, as shown in FIG. 6, the output shaft 5A may be coupled to the first through hole 31aA of the base member 31A, but on the other hand, may not be coupled to the second through hole 22aA of the output member 22A.

Specifically, the output shaft 5A is coupled to the first through hole 31aA, and simultaneously, the first boss portion 31bA is coupled to the second through hole 22aA. More specifically, the output shaft 5A is spline-coupled to the first through hole 31aA. Additionally, the first boss portion 31bA is spline-coupled to the second through hole 22aA. In other words, the first boss portion 31bA includes a spline groove not only on the inner peripheral surface thereof but also on the outer peripheral surface thereof. Additionally, the outer peripheral surface of the output shaft 5A is spline-coupled to the inner peripheral surface of the first boss portion 31bA. Moreover, the outer peripheral surface of the first boss portion 31bA is spline-coupled to the inner peripheral surface of the second boss portion 22bA. The output shaft 5A, the first boss portion 31bA and the second boss portion 22bA are radially disposed in this order. Additionally, these components overlap as seen in a radial view. According to the configuration, the base member 31A is disposed in a torque transmission path. Therefore, in actuation of the damper device 100A, a predetermined rotation-directional torque acts on the base member 31A. As a result, it is possible to reduce impact of backlash between the base member 31A and the output shaft 5A.

Modification 2

Figure 7:
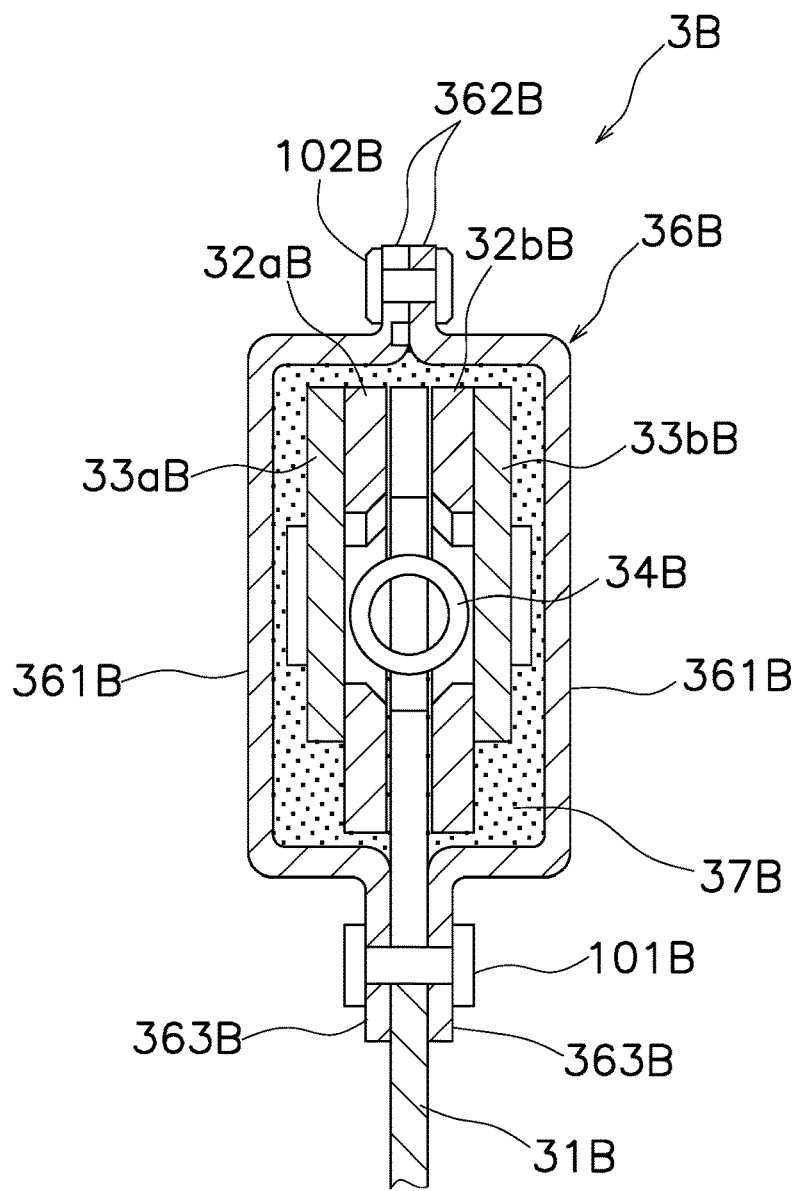
FIG. 7 is a cross-sectional side view of a dynamic vibration absorber according to another modification.

As shown in FIG. 7, the dynamic vibration absorber 3B may further include a housing 36B. The housing 36B is configured to accommodate the first and second mass bodies 32aB and 32bB. Additionally, the housing 36B accommodates the coil springs 34B and so forth. The housing 36B is attached to the base member 31B by a fastening member(s) 101B such as a rivet(s) or so forth.

The housing 36B is composed of two annular plates 361B. The respective annular plates 361B form an internal space. In other words, the respective annular plates 361B are disposed in axial alignment. Additionally, the respective annular plates 361B bulge oppositely to each other, whereby the internal space is formed.

Each annular plate 361B includes an outer peripheral flange 362B in the outer peripheral end thereof. The annular plates 361B are fixed to each other at the outer peripheral flanges 362B thereof by a fastening member(s) 102B such as a rivet(s). In other words, the outer peripheral flanges 362B of the respective annular plates 361B make contact with each other. Additionally, the outer peripheral flanges 362B are fixed to each other by the fastening member(s) 102B penetrating therethrough. It should be noted that the outer peripheral flanges 362B may be fixed to each other by welding or so forth.

Additionally, each annular plate 361B includes an inner peripheral flange 363B in the inner peripheral end thereof. The respective inner peripheral flanges 363B make contact with the base member 31B. In other words, the inner peripheral flanges 363B are disposed while interposing the base member 31B therebetween. Moreover, the respective inner peripheral flanges 363B are fixed to the base member 31B by the fastening member(s) 101B penetrating the respective inner peripheral flanges 363B and the base member 31B. It should be noted that the respective inner peripheral flanges 363B may be fixed to the base member 31B by welding or so forth.

The interior of the housing 36B is filled with a viscous fluid 37B. For example, lubricating oil or so forth can be used as the viscous fluid 37B.

Modification 3

Figure 8:
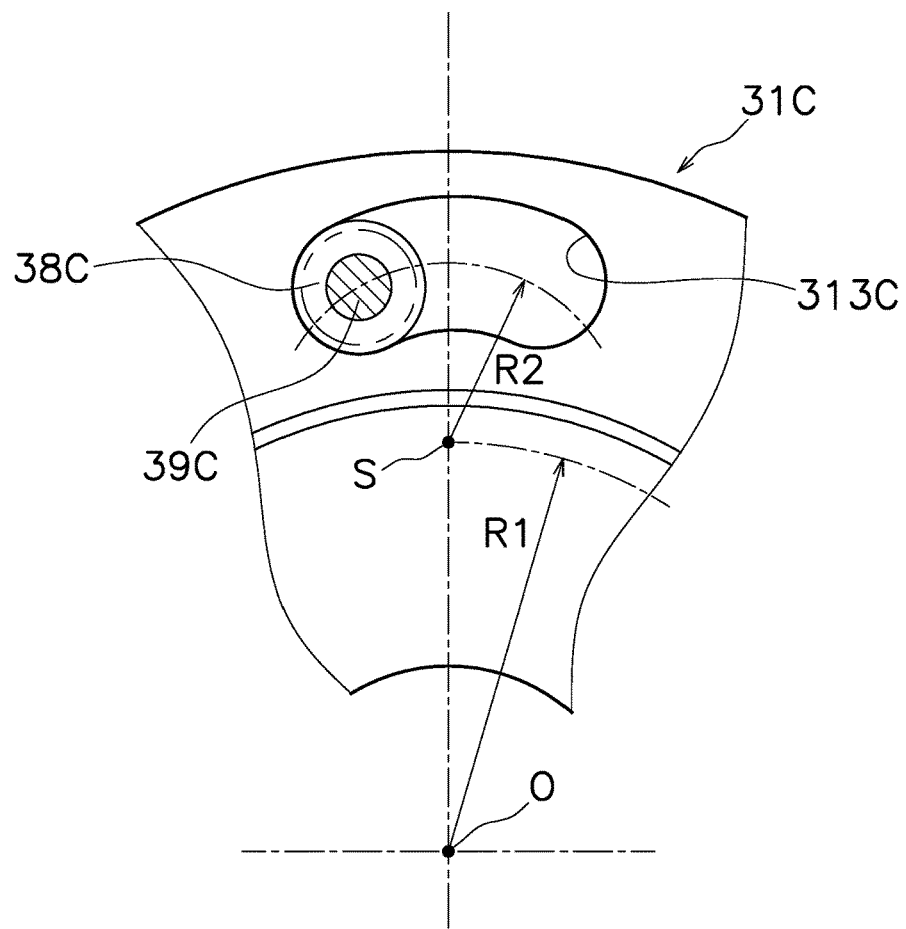
FIG. 8 is an enlarged front view of a dynamic vibration absorber according to yet another modification.
Figure 9:
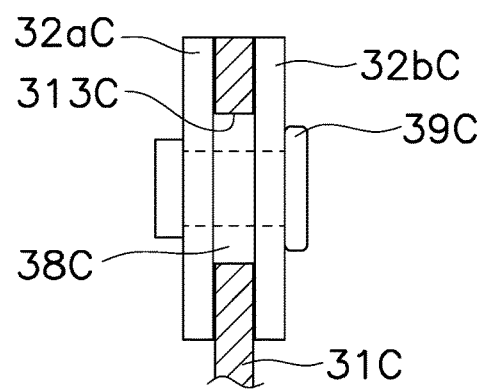
FIG. 9 is a cross-sectional side view of the dynamic vibration absorber according to the yet another modification.

The configuration of the dynamic vibration absorber 3 is not limited to that of the aforementioned exemplary embodiment. For example, as shown in FIGS. 8 and 9, the first and second mass bodies 32aC and 32bC of the dynamic vibration absorber 3 may be attached to the base member 31C so as to be capable of swaying in the circumferential direction. Moreover, the dynamic vibration absorber 3 can be configured to attenuate rotational fluctuations by swaying of the first and second mass bodies 32aC and 32bC. A swaying center S of the respective first and second mass bodies 32aC and 32bC is disposed in a different position from the rotational axis O of the damper device 100.

Specifically, the base member 31C includes a slit(s) 313C having a circular-arc shape. The slit 313C is made in the shape of a circular arc with a radius R2 about the point S disposed at a predetermined distance R1 from the rotational axis O of the damper device 100. It should be noted that the slit 313C extends in the rotational direction.

A collar 38C is disposed in the slit 313C. The collar 38 has a cylindrical shape. The collar 38C has a diameter smaller than the radial width of the slit 313C. Additionally, the collar 38C has a length longer than that of the base member 31C. The collar 38C is disposed axially between the first and second mass bodies 32aC and 32bC. The first mass body 32aC, the second mass body 32bC and the collar 38C are fixed by a rivet 39C. The output member 22 may function as the base member 31C. The first and second mass bodies 32aC and 32bC sway along the slit 313C.

Modification 4

Figure 10:
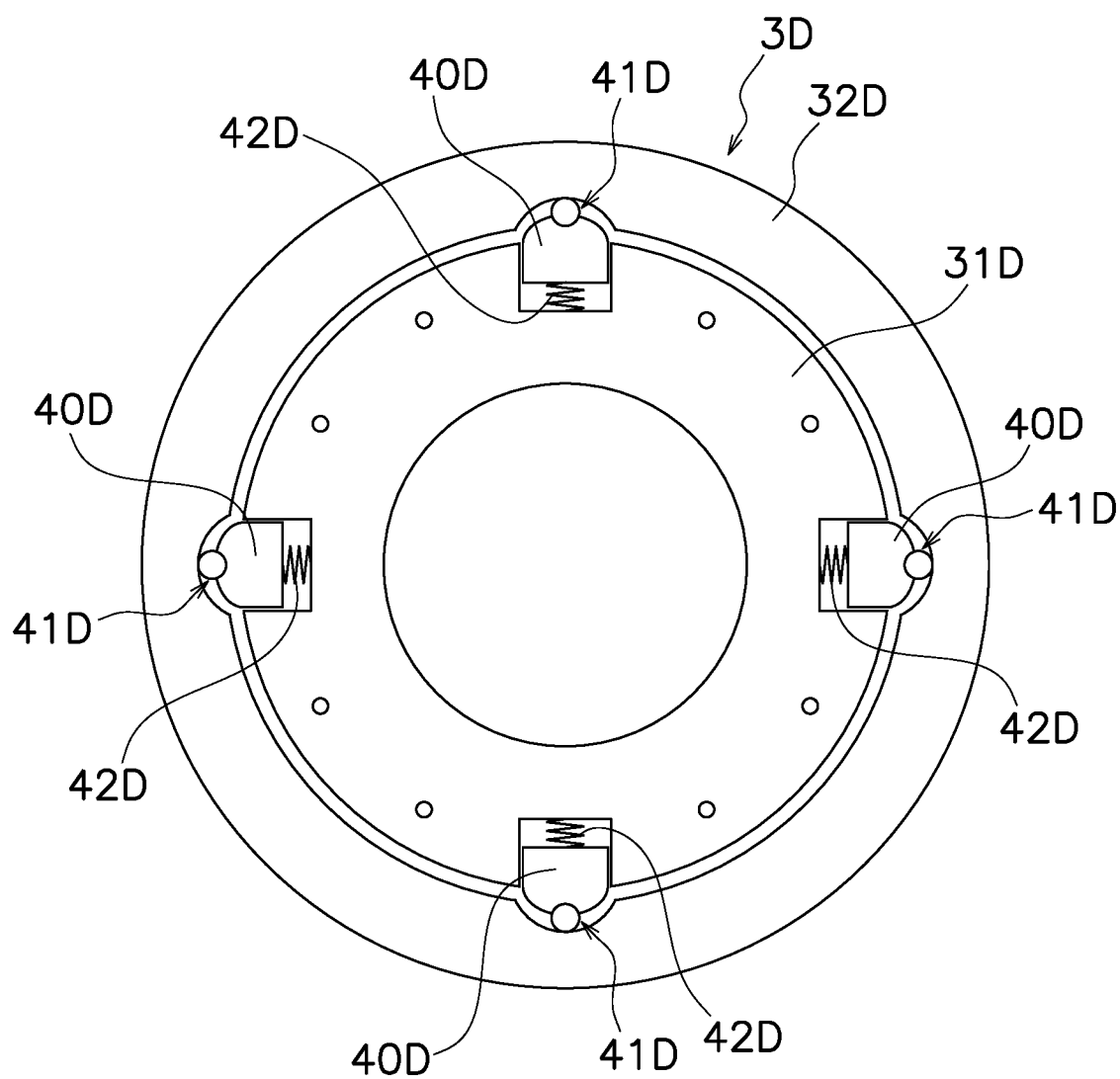
FIG. 10 is a front view of a dynamic vibration absorber according to further yet another modification.

The configuration of the dynamic vibration absorber 3 is not limited to that of the aforementioned exemplary embodiment. For example, as shown in FIG. 10, the dynamic vibration absorber 3 includes a mass body 32D, a plurality of centrifugal elements 40D and a plurality of cam mechanisms 41D. Additionally, the dynamic vibration absorber 3D may include a plurality of coil springs 42D.

The mass body 32D has an annular shape, for instance, and is disposed radially outside the base member 31D. The mass body 32D and the base member 31D are disposed at an interval in the radial direction. It should be noted that the mass body 32D and the base member 31D are disposed in radial alignment. In other words, as seen in the radial direction, the mass body 32D and the base member 31D overlap.

The mass body 32D and the base member 31D are rotated about the rotational axis O. The mass body 32D and the base member 31D are rotatable relative to each other.

Each centrifugal element 40D is disposed in the base member 31D, and is movable radially outward by a centrifugal force generated by rotation of the base member 31D. More specifically, as shown close-up in FIG. 11, the base member 31D includes a plurality of recesses 314D on the outer peripheral surface thereof. Each recess 314D is provided on the outer peripheral surface of the base member 31D so as to be recessed radially inward. Additionally, each centrifugal element 40D is inserted into each recess 314D so as to be movable in the radial direction. For example, each centrifugal element 40D and each recess 314D are provided such that a friction coefficient between the outer surface of each centrifugal element 40D and the inner surface of each recess 314D is set to be less than or equal to 0.1. Additionally, each centrifugal element 40D is a plate having approximately the same thickness as the base member 31D, and includes an outer peripheral surface 401D having a circular-arc shape. Moreover, each centrifugal element 40D includes a roller accommodation portion 402D recessed inward from the outer peripheral surface 401D.

Each cam mechanism 41D is composed of each of a plurality of rollers 411D as cam followers and each of a plurality of cams 412D provided on the inner peripheral surface of the mass body 32D. Each roller 411D is attached to the roller accommodation portion 402D of each centrifugal element 40D, and is radially movable together with each centrifugal element 40D. It should be noted that each roller 411D may be rotatable in or fixed to the roller accommodation portion 402D. Each cam 412D is a circular-arc surface with which each roller 411D makes contact. When the base member 31D and the mass body 32D are rotated relative to each other within a predetermined angular range, each roller 411D is moved along each cam 412D.

When rotational phase difference is produced between the base member 31D and the mass body 32D by the contact between each roller 411D and each cam 412D, a centrifugal force generated in each centrifugal element 40D and each roller 411D is converted into a force directed in the circumferential direction to reduce the rotational phase difference.

Each coil spring 42D is disposed between the bottom surface of each recess 314D and the radially inner surface of each centrifugal element 40D, and urges each centrifugal element 40D radially outward. Each centrifugal element 40D and each roller 411D are pressed onto each cam 412D of the mass body 32D by the urging force of each coil spring 42D. Therefore, each roller 411D makes contact with each cam 412D even when a centrifugal force does not act on each centrifugal element 40D in a condition that the base member 31D is not rotated.

[Actuation of Cam Mechanisms 41D]

Figure 11:
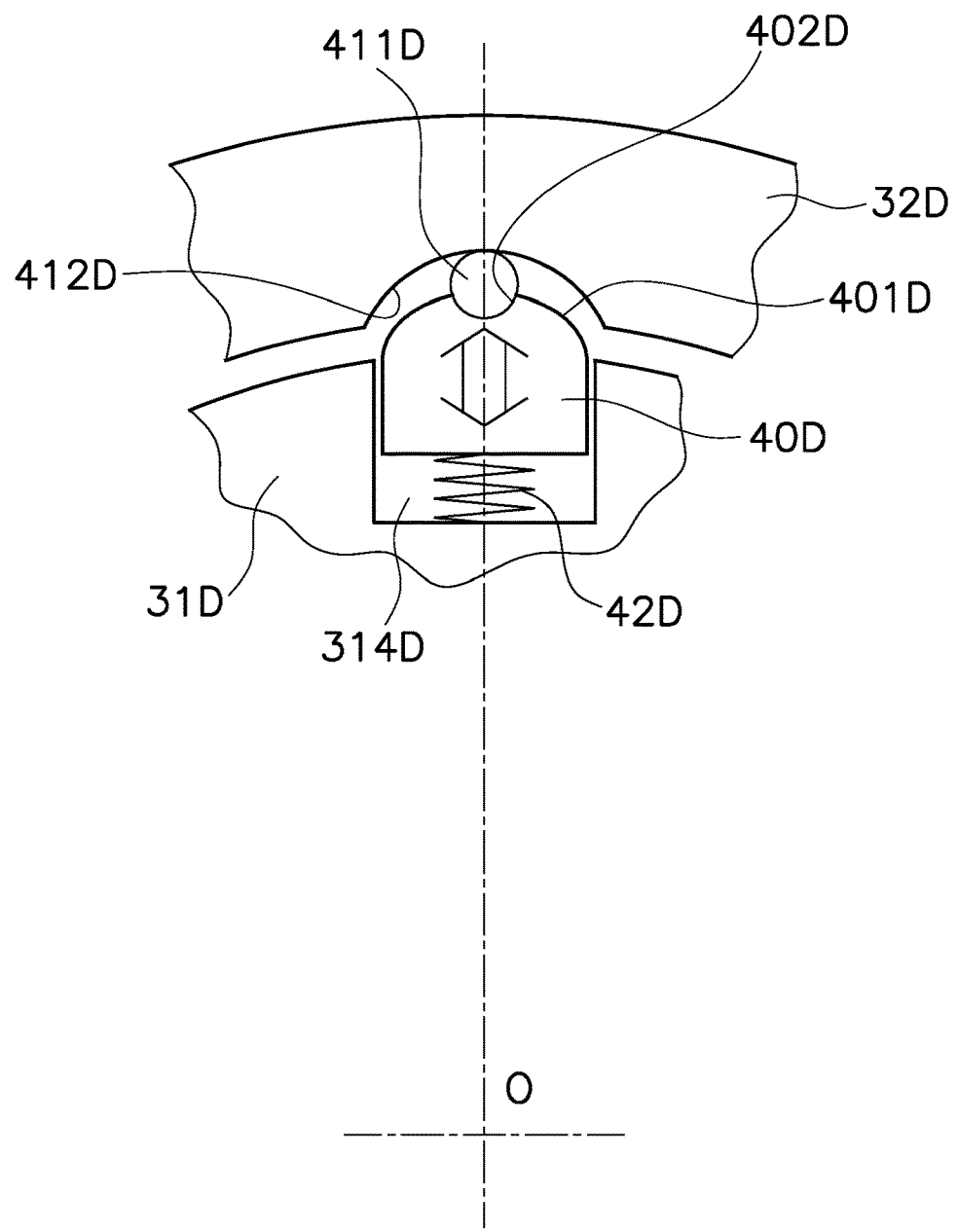
FIG. 11 is an enlarged front view of the dynamic vibration absorber according to the further yet another modification.
Figure 12:
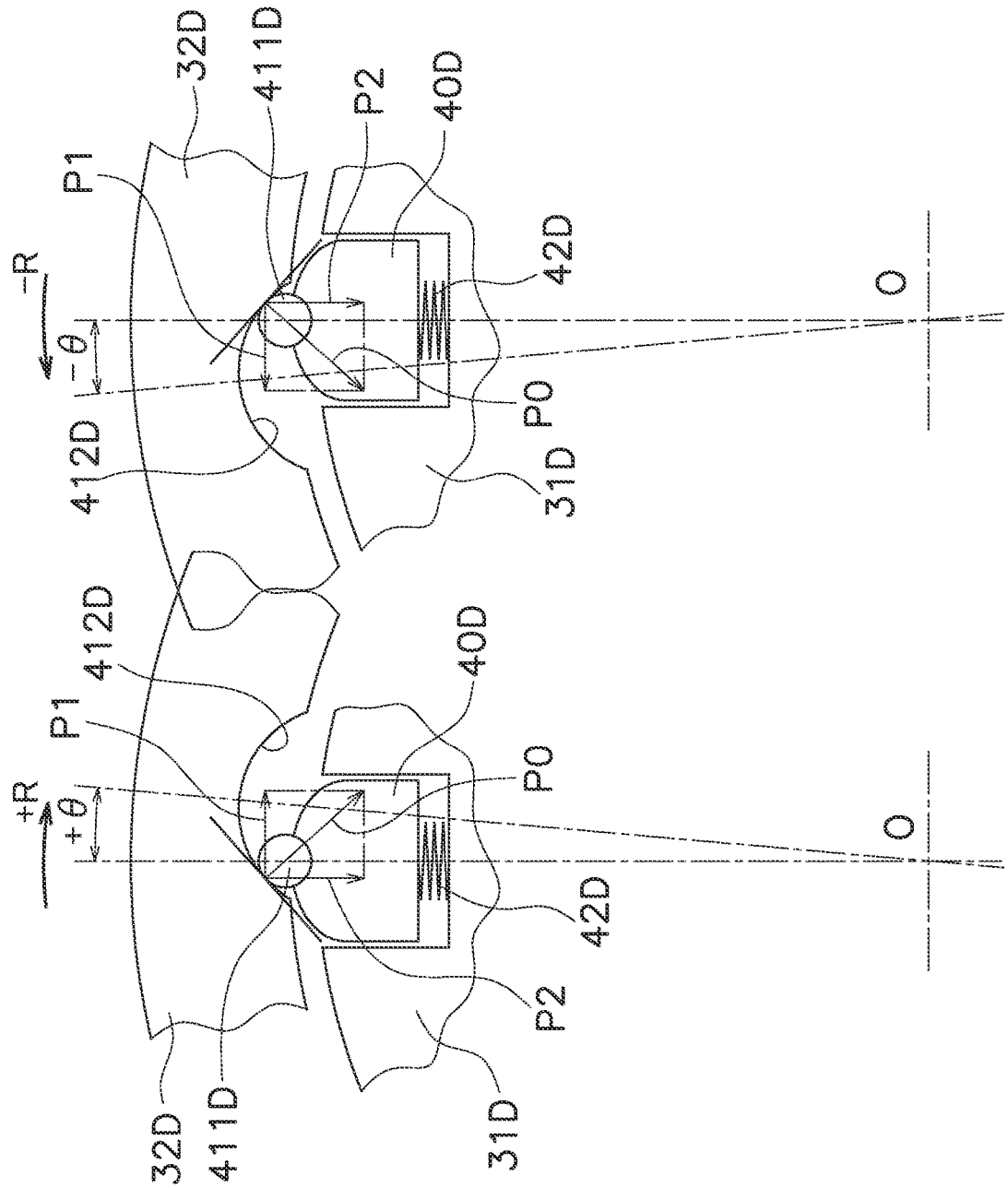
FIGS. 12A and 12B are diagrams for explaining actions of the dynamic vibration absorber according to the further yet another modification.

Actuation of each cam mechanism 41D (inhibition of torque fluctuations) will be explained with FIGS. 11 and 12.

A torque transmitted to the output shaft 5 is transmitted to the base member 31D. When torque fluctuations do not exist in torque transmission, the base member 31D and the mass body 32D are rotated in the condition shown in FIG. 11. In other words, each roller 411D of each cam mechanism 41D makes contact with the deepest position (circumferential middle position) on each cam 412D, and rotational phase difference between the base member 31D and the mass body 32D is "0".

As described above, the rotation-directional relative displacement between the base member 31D and the mass body 32D is referred to as "rotational phase difference". In FIGS. 11 and 12, these terms indicate displacement between the circumferential middle position of each centrifugal element 40D and each roller 411D and that of each cam 412D.

On the other hand, when torque fluctuations exist in torque transmission, rotational phase difference ±θ is produced between the base member 31D and the mass body 32D as shown in FIGS. 12A and 12B. FIG. 12A shows a condition that rotational phase difference +θ is produced to a +R side, whereas FIG. 12B shows a condition that rotational phase difference −θ is produced to a −R side.

As shown in FIG. 12A, when the rotational phase difference +θ is produced between the base member 31D and the mass body 32D, each roller 411D of each cam mechanism 41D is moved along relative to each cam 412D to the left side in FIGS. 12A and B. At this time, a centrifugal force acts on each centrifugal element 40D and each roller 411D.

Hence, a reaction force to be received by each roller 411D from each cam 412D has a direction and a magnitude indicated by P0 in FIG. 12A. A first force component P1 and a second force component P2 are produced by the reaction force P0. The first force component P1 is directed in the circumferential direction, whereas the second force component P2 is directed to move each centrifugal element 40D and each roller 411D toward the rotational center.

Additionally, the first force component P1 acts as a force to move the base member 31D to the rightward in FIG. 12A through each cam mechanism 41D. In other words, a force directed to reduce the rotational phase difference between the base member 31D and the mass body 32D acts on the base member 31D. On the other hand, the second force component P2 moves each centrifugal element 40D and each roller 411D to the radially inner peripheral side against the urging force of each coil spring 42D.

FIG. 12B shows a condition that the rotational phase difference −θ is produced between the base member 31D and the mass body 32D. FIG. 12B is similar to FIG. 12A regarding the actuation of each cam mechanism 41D, although FIG. 12B is different from FIG. 12A only regarding the moving direction of each roller 411D of each cam mechanism 41D and the directions of the reaction force P0, the first force component P1 and the second force component P2.

As described above, when rotational phase difference is produced between the base member 31D and the mass body 32D by torque fluctuations, the base member 31D receives a force (the first force component P1) directed to reduce the rotational phase difference between the both by the centrifugal force acting on each centrifugal element 40D and the working of each cam mechanism 41D. Torque fluctuations are inhibited by this force.

The aforementioned force inhibiting torque fluctuations varies in accordance with the centrifugal force, in other words, the rotation speed of the base member 31D, and also varies in accordance with the rotational phase difference and the shape of each cam 412D. Therefore, by suitably setting the shape of each cam 412D, characteristics of the damper device 100 can be made optimal in accordance with the specification of the engine and so forth.

For example, each cam 412D can be made in a shape that makes the first force component P1 linearly vary in accordance with the rotational phase difference in a condition where the centrifugal force acting is constant. Alternatively, each cam 412D can be made in a shape that makes the first force component P1 non-linearly vary in accordance with the rotational phase difference.

Modification 5

Figure 13:
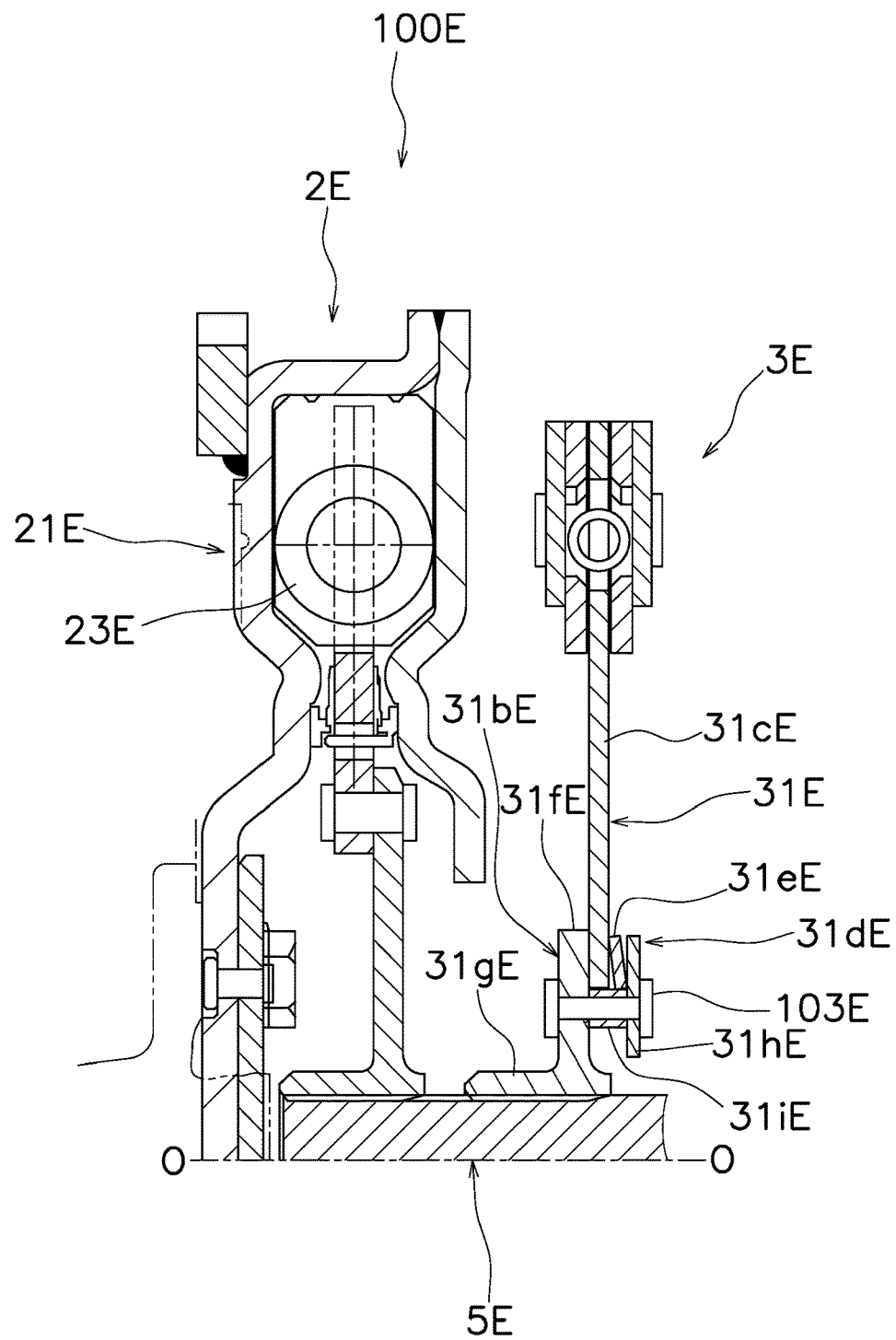
FIG. 13 is a cross-sectional side view of a damper device according to still further yet another modification.

As shown in FIG. 13, the base member 31E of the dynamic vibration absorber 3E may include a torque limiting portion 31dE. Specifically, the torque limiting portion 31dE is disposed between the body 31cE and the first boss portion 31bE. It should be noted that in the aforementioned exemplary embodiment, the body 31cE and the first boss portion 31bE are provided as a single member. In the present modification, however, the body 31cE and the first boss portion 31bE are provided as separate members.

The torque limiting portion 31dE limits transmission of a torque inputted to the body 31cE from the output shaft 5E. Specifically, when the torque inputted to the body 31cE from the output shaft 5E is less than a predetermined threshold, the torque limiting portion 31dE rotates the body 31cE unitarily with the output shaft 5E. In other words, the torque limiting portion 31dE transmits the torque, transmitted thereto from the output shaft 5E, to the body 31cE. On the other hand, when the torque inputted to the body 31cE from the output shaft 5E is greater than or equal to the predetermined threshold, the torque limiting portion 31dE rotates the body 31cE relative to the output shaft 5E. In other words, the torque limiting portion 31dE does not transmit the torque, transmitted thereto from the output shaft 5E, to the body 31cE. It should be noted that regardless of the value of the torque inputted from the output shaft 5E, the boss portion 31bE is rotated unitarily with the output shaft 5E.

The torque limiting portion 31dE limits transmission of the torque inputted to the body 31cE from the output shaft 5E by a friction force. The torque limiting portion 31dE includes an urging member 31eE. The urging member 31eE urges the body 31cE toward an attachment portion 31fE of the boss portion 31bE in the axial direction. It should be noted that the boss portion 31bE includes a boss body 31gE and the attachment portion 31fE. The boss body 31gE has a cylindrical shape and is attached to the output shaft 5E. The attachment portion 31fE extends radially outward from the boss body 31gE. The attachment portion 31fE has a disc shape. The urging member 31eE makes contact with the inner peripheral end of the body 31cE. The body 31cE is interposed and held between the attachment portion 31fE and the urging member 31eE.

When the torque inputted to the body 31cE is less than the predetermined threshold, the body 31cE is unitarily rotated with the boss portion 31bE by a static friction force between the body 31cE and the attachment portion 31fE. On the other hand, when the torque inputted to the body 31cE is greater than or equal to the predetermined threshold, a force exceeding the maximum static friction force acts on the body 31cE, whereby the body 31cE is rotated relative to the boss portion 31bE. It should be noted that a friction material may be interposed between the body 31cE and the attachment portion 31fE.

The urging member 31eE is, for instance, a disc spring. The outer peripheral end of the urging member 31eE makes contact with the body 31cE. On the other hand, the inner peripheral end of the urging member 31eE makes contact with a support plate 31hE to be described.

The torque limiting portion 31dE further includes the support plate 31hE. The support plate 31hE supports the urging member 31eE in the axial direction. The support plate 31hE is disposed at an interval from the body 31cE in the axial direction. The urging member 31eE is disposed axially between the body 31cE and the support plate 31hE. The urging member 31eE makes contact at one end thereof with the body 31cE in the axial direction, while making contact at the other end thereof with the support plate 31hE in the axial direction. While in a compressed state, the urging member 31eE is disposed between the body 31cE and the support plate 31hE.

The torque limiting portion 31dE further includes a spacer(s) 31iE. The spacer(s) 31iE has a cylindrical shape. The spacer(s) 31iE is disposed axially between the boss portion 31E band the support plate 31hE. A fastening member(s) 103E such as a rivet(s) fastens the attachment portion 31fE, the support plate 31hE and the spacer(s) 31iE together. The spacer(s) 31iE reliably produces a space between the attachment portion 31fE and the support plate 31hE in the axial direction. The body 31cE and the urging member 31eE are disposed in the axial space reliably produced by the spacer(s) 31iE.

Modification 6

In the aforementioned exemplary embodiment, the output member 22 includes the second through hole 22a, but may include a recess instead of the second through hole 22a. In this case, the output shaft 5 is coupled to the recess.

REFERENCE SIGNS LIST

2 Damper device body
21 Input member
22 Output member
22a Second through hole
3 Dynamic vibration absorber
31 Base member
31a First through hole
31b First boss portion
32 Mass body
5 Output shaft
100 Damper device

The invention claimed is:

1. A damper device comprising:
a damper device body including an input member and an output member, the input member and the output member coupled to be rotatable relative to each other;
an output shaft configured to output a torque transmitted thereto from the damper device body; and
a dynamic vibration absorber attached to the output shaft, the dynamic vibration absorber including a base member and a mass body, the base member attached to the output shaft, the mass body disposed to be rotatable relative to the base member,
the dynamic vibration absorber further including
a centrifugal element disposed to receive a centrifugal force generated by rotation of the output shaft, and
a cam mechanism configured to convert the centrifugal force acting on the centrifugal element into a circumferential force.

2. The damper device according to claim 1, wherein the base member includes a first through hole, and the output shaft is coupled to the first through hole.

3. The damper device according to claim 2, wherein the output shaft is spline-coupled to the first through hole.

4. The damper device according to claim 2, wherein the base member includes a boss portion provided with the first through hole.

5. The damper device according to claim 4, wherein the output member includes a second through hole, and the boss portion is coupled to the second through hole.

6. The damper device according to claim 5, wherein the boss portion is spline-coupled to the second through hole.

* * * * *